United States Patent Office 3,211,339
Patented Oct. 12, 1965

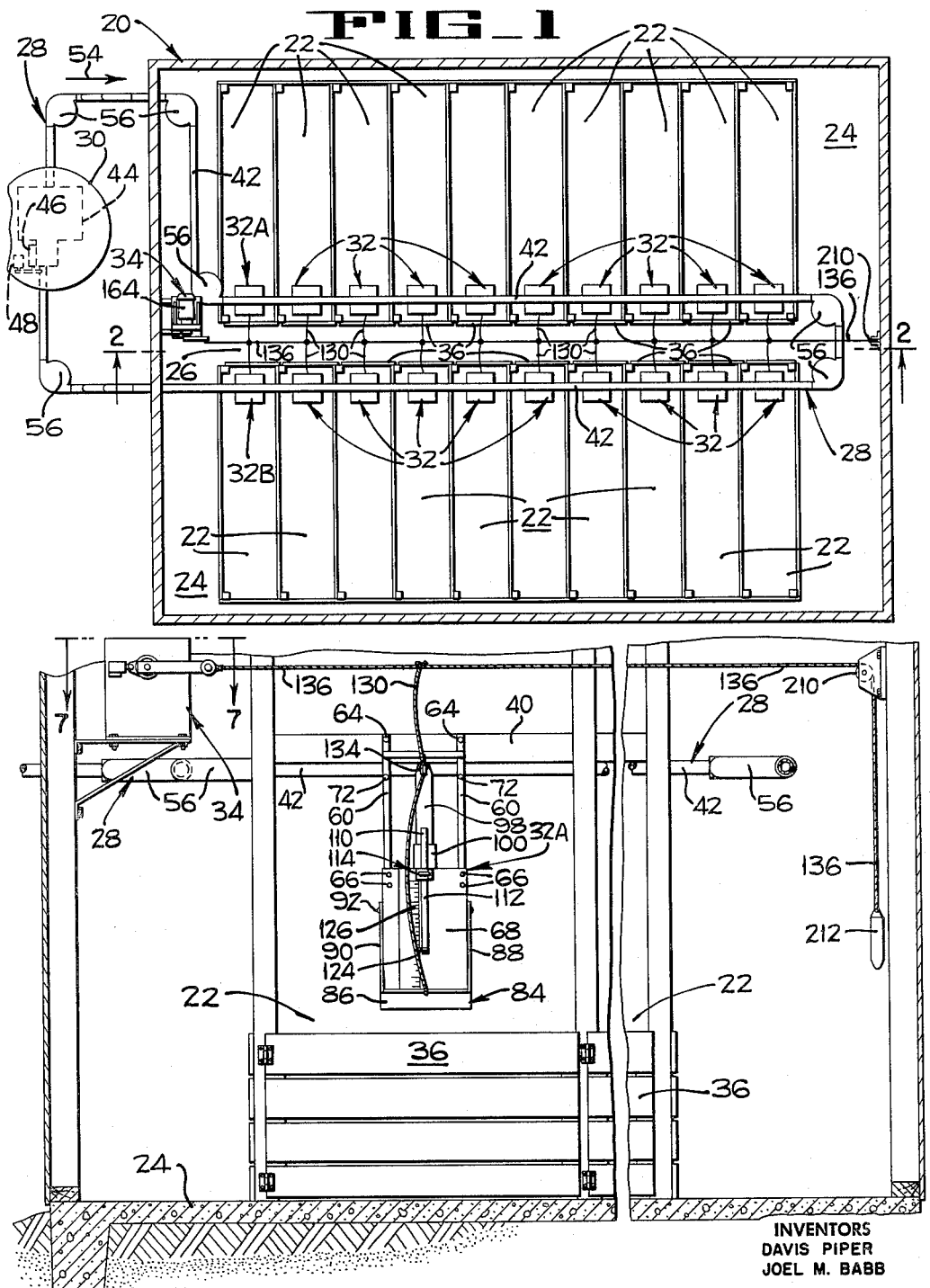

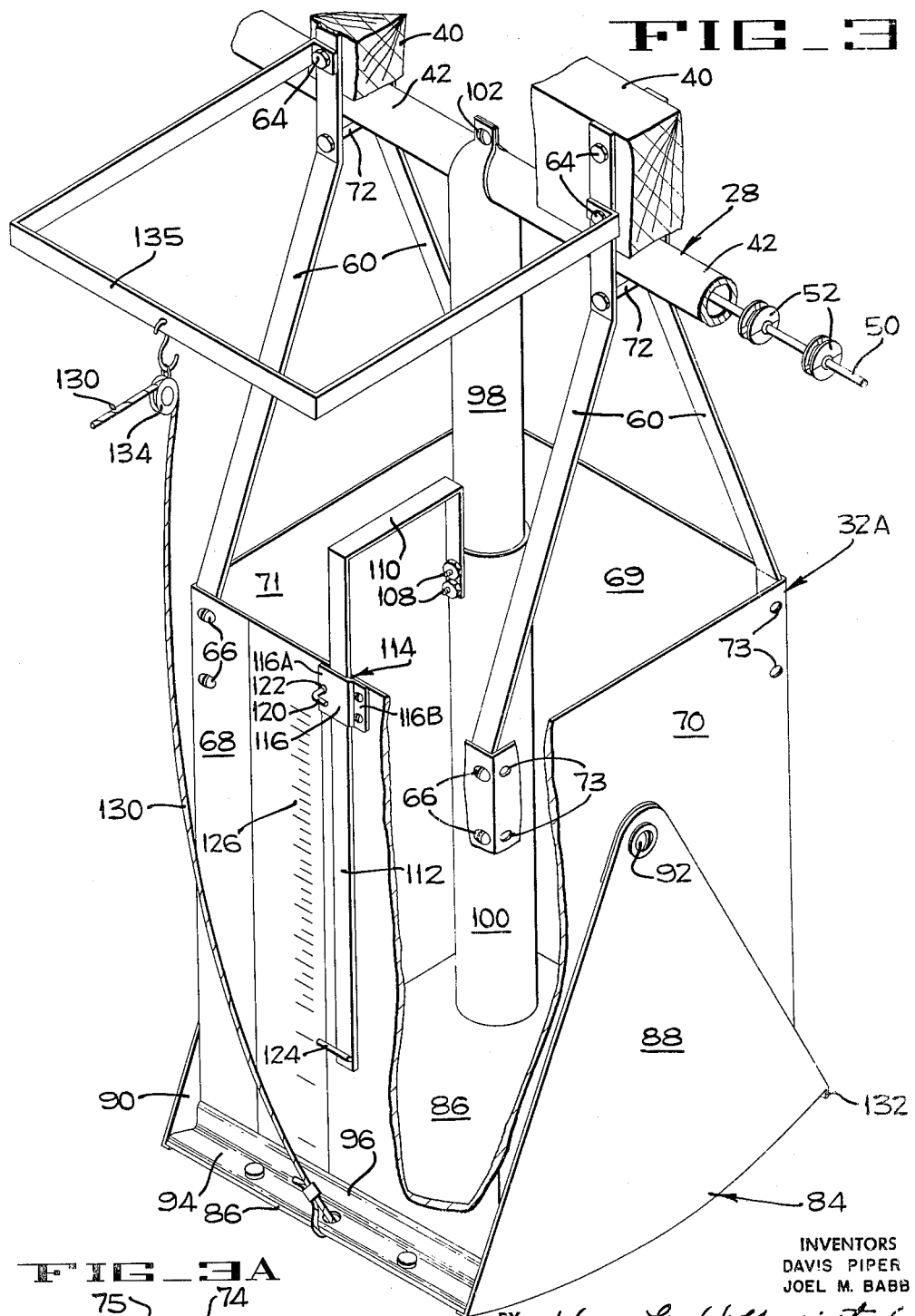

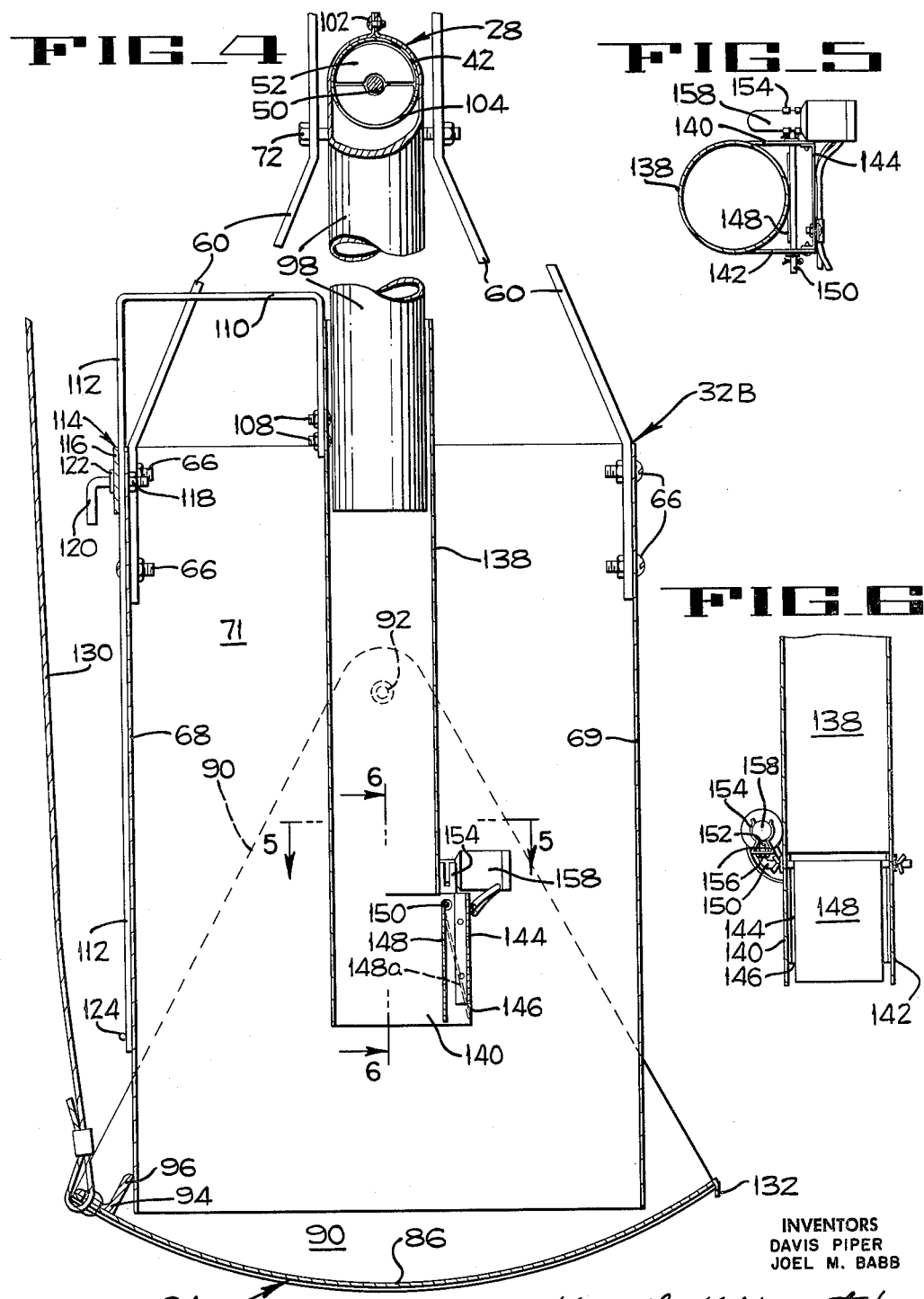

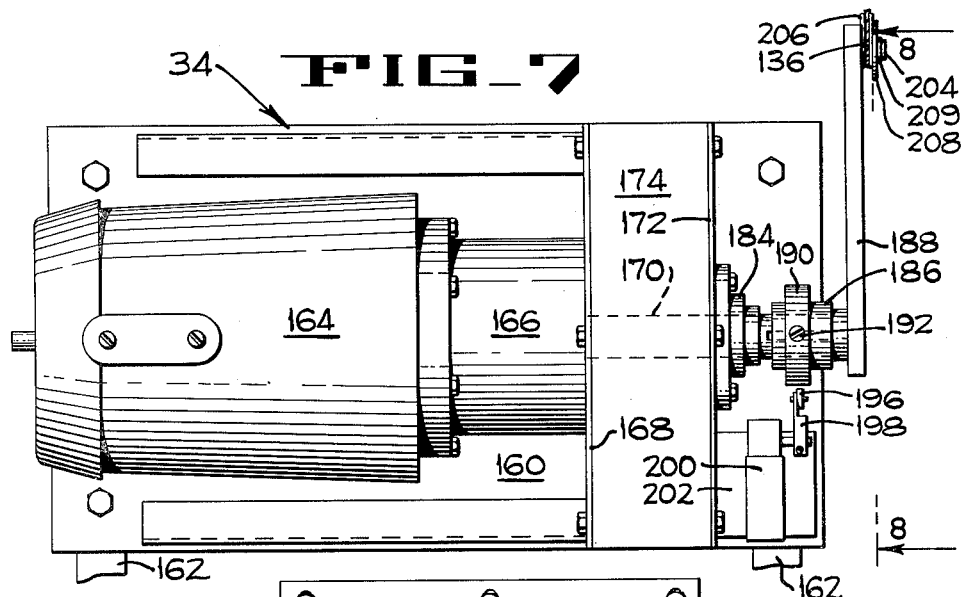
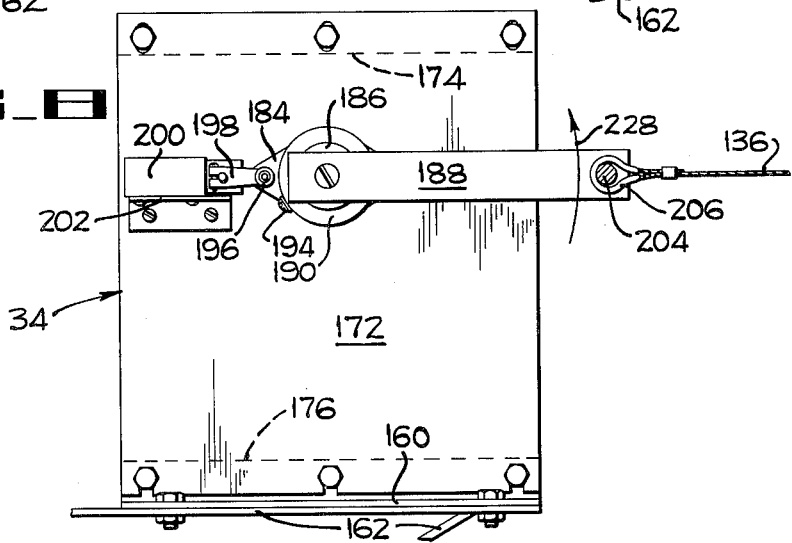
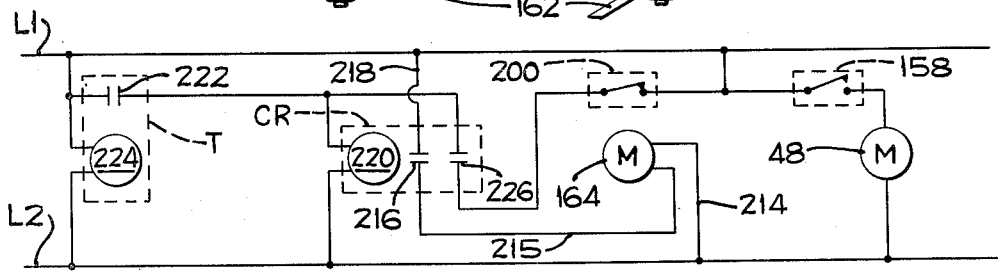

3,211,339
AUTOMATIC LIVESTOCK FEEDER
Davis Piper, Tipton, Ind., and Joel M. Babb, Lincoln, Nebr., assignors to FMC Corporation, San Jose, Calif., a corporation of Delaware
Filed Sept. 9, 1963, Ser. No. 307,584
3 Claims. (Cl. 222—76)

The present invention pertains to livestock feeding systems, and more particularly relates to an automatic feed conveying, collecting, measuring and dumping mechanism for periodically supplying measured amounts of feed to animals.

In one method of finishing hogs for market, the animals are confined in indoor pens and are grown to market size by means of periodic, limited feedings. Hogs thus produced usually bring better than ordinary prices because they are more lean than hogs which have unlimited feedings.

A desirable method of automated feeding, already in use in the poultry raising industry, includes the operation of dropping the feed from an overhead supply source so that the feed cannot be contaminated by the animals before it is consumed. Present devices adapted for use in automatic overhead feeding system, however, are so constructed that a mechanical or electrical failure can result in the feed supply failing to be shut off, thus resulting in a continuous deposit of feed until someone observes and corrects the malfunction. Also, many automatic feeding systems are characterized by relatively complex mechanical and electrical components. Such complexity results in a high initial cost, and requires that the system be given frequent maintenance attention.

One of the objects of the present invention is to provide an improved automatic animal feeder for dispensing accurately measured amounts of feed to a plurality of feeding stations.

Another object of this invention is to provide an automatic feeding system for animals wherein mechanically opened feed hopper gates are closed by gravity so that feed cannot flood the feed stations under the hoppers in the event of certain electrical or mechanical malfunctions.

Another object is to provide a feed collecting and dumping hopper wherein various volumes of feed are correlated to corresponding weights of those volumes, whereby accurate weight charges of feed are dispensed without requiring a weighing operation.

Another object is to provide an efficient and relatively inexpensive actuating means for simultaneously opening the gates of a plurality of feed hoppers.

Other objects and advantages of the present invention will become apparent from the following description and the accompanying drawings, wherein:

FIGURE 1 is a diagrammatic plan of a hog barn having a plurality of hog pens, each pen being located under a feed collecting and dispensing hopper constructed in accordance with the teachings of the present invention.

FIGURE 2 is an enlarged fragmentary section taken along line 2—2 on FIGURE 1.

FIGURE 3 is an enlarged isometric of one of the feed collecting, measuring and dispensing hoppers used with each hog pen shown in FIGURE 1, except the last hopper in the system.

FIGURE 3A is an elevation of a strap for supporting the feed conveyor tube in conjunction with the hopper shown in FIGURE 3.

FIGURE 4 is a fragmentary vertical section of the feed collecting, measuring and dispensing hopper used with the last hog pen in the automatic feeding system.

FIGURE 5 is a horizontal section taken along line 5—5 on FIGURE 4.

FIGURE 6 is a vertical section taken along line 6—6 on FIGURE 4.

FIGURE 7 is a plan of the power dumping mechanism which simultaneously dumps the contents of all the feed hoppers, the view being taken looking in the direction of arrows 7—7 of FIGURE 2.

FIGURE 8 is a vertical section of the power dumping mechanism shown in FIGURE 7, and is taken along line 8—8 of FIGURE 7.

FIGURE 9 is an electrical control diagram.

A typical barn 20 (FIG. 1) for raising hogs in confinement includes a row of pens 22 which are built upon the floor 24 at each side of a central aisle 26 that provides access to the pens. In accordance with one particular plan, each pen is 4 feet wide and 16 feet long and is adapted to enclose ten hogs. After reaching a weight of about 100 pounds, the hogs are fed limited amounts of feed several times a day until they attain their full market weight.

Briefly, the present invention provides an automatic feeding apparatus for distributing a preselected amount of feed into each pen 22 at preselected time intervals by means including an overhead, endless circuit feed conveyor system 28 which carries feed from an outdoor bulk feed supply bin 30 through the barn 20. The feed conveyor system 28 is of the type disclosed in United States Patent No. 2,794,421, which patent is assigned to the assignee of the present application.

The feed conveyor system 28 distributes the feed into a feed dispensing hopper unit 32 mounted over each pen 22. All of the feed dispensing hoppers are simultaneously emptied into the pens by means of a power dumping mechanism 34 which is controlled by a time switch to raise and open a gate associated with each hopper. As soon as the feed is dumped, a mechanism of the feeding apparatus releases the gates of the hoppers from mechanical control so that they are immediately closed by gravity. Electrical controls, which include a novel electrical switch and switch actuator in one of the hoppers 32, cause the empty hoppers to immediately be refilled with feed in readiness for the next automatic feeding operation.

More specifically, each pen 22 is provided with a door or gate 36 (FIG. 2) which fronts on the aisle 26. Each feed dispensing hopper 32 is suspended behind and above the door of the associated pen from an overhead beam 40, and lies beneath a tube 42 which is part of the feed conveyor portion of the feed conveyor system 28. The tube 42 (FIG. 1) extends in an endless circuit from the outside bulk feed supply bin 30, through the barn 20, and over each of the feed dispensing hoppers 32. The automatic feed conveyor system 28 includes a supply hopper 44 which is mounted on the bottom of the bulk feed supply bin 30 so as to be filled therefrom by gravity.

As is disclosed in the above-identified patent, a power drive mechanism 46 is mounted adjacent the hopper 44 and, by means of an electric motor 48, is arranged to drive an endless feed chain 50 (FIG. 3) which carries circular pusher members 52 through the feed conveyor tube 42. The feed in the hopper 44 is thus forced through the conveyor tube 42 in the direction of the arrow 54 (FIG. 1). A plurality of ninety degree elbows 56 interconnect various runs of the conveyor tube 42 at the points where the tube changes its horizontal or vertical direction.

The first feed hopper 32 (FIG. 1) shown at 32A and, all of the succeeding hoppers 32 except the last hopper in the system, shown at 32B, are identical. Thus, the following description of the hopper located at 32A will serve to describe all the hoppers except the one located at 32B. The hopper at 32B will later be separately described in conjunction with FIGURE 4.

Further, the hopper at 32B (FIG. 4), is of the same construction as the other hoppers except for one part later pointed out, and can thus be considered a section view of the hopper at 32A shown in FIGURE 3. Similar parts of the hoppers in FIGURES 3 and 4, accordingly, retain the same reference numerals.

Each feed hopper 32 (FIG. 3) is suspended from the beam 40 by four strap-iron support brackets 60, each bracket having an upper end portion secured by lag screws 64 to the beam 40, and a lower end portion secured by bolts 66 to one of two opposed vertical hopper walls 68 and 69. The other two opposed hopper walls 70 and 71 provided with apertures 73 are to receive the bolts 66 if a particular installation should require positioning the hopper to face ninety degrees in either direction from the position illustrated. The hopper walls 68, 69, 70 and 71 define a tubular body of square cross-section, and the wall 68 faces the aisle 26 (FIG. 1).

The feed conveyor tube 42 is supported by two bolts 72 which interconnect the upper end portions of each pair of adjacent brackets 60 at a point beneath the beam 40. If the conveyor tube 42 requires a ninety degree repositioning, a strap 74 (FIGURE 3A) is mounted on the bolts 72 at each side of the beam 40. Each strap 74 is provided with an arcuate recess 75 in its upper edge that forms a saddle to support the tube 42.

A pivotally mounted gate 84 (FIG. 3) normally lies under the open bottom end of the tubular hopper body defined by the walls 68–71 inclusive, and includes a curved bottom plate 86, each curved edge of which is secured to an upstanding, generally triangular wall 88 or 90. The upper end portion of each wall 88 and 90 is pivotally supported by a pivot bolt 92 (FIGS. 3 and 4) that projects outwardly from the adjacent hopper wall 70 or 71.

Each side of the gate 84 adjacent the front hopper wall 68 is provided with a relatively heavy angle bar 94 that is riveted to the bottom plate 86. The upstanding flange 96 of the angle bar 94 is adapted to function as a stop member for the gate by engaging the hopper wall 68 (FIG. 4), and the bar provides a weight which unbalances the gate 84 and assists in the gravity operation of the gate in moving toward its illustrated closed position.

Each feed dispensing hopper 32 (FIG. 3) is filled from the feed conveyor tube 42 by means of an associated feed measuring tube comprising telescoped upper and lower tubular sections 98 and 100, respectively. The tube 98 has a split upper end portion that is clamped by a bolt 102 onto the feed conveyor tube 42. An aperture 104 (FIG. 4) in tube 42 is in alignment with the feed tube 98 so that the feed conveyed through the tube 42 by the chain pushers 52 drops through the feed tube 98 and into the dispensing hopper 32. The feed accumulates upon the curved bottom plate 86 of the gate 84.

The lower feed tube 100 (FIG. 3) of each hopper 32, except the last hopper at 32B, is slidably mounted on the tube 98. The upper end portion of the tube 100 is secured by machine screws 108 to a strap 110, a long leg 112 of which extends along the front wall 68 of the hopper and is gripped by a releasable clamp 114. The bottom end of the tube 100 can thus be positioned at various elevations above the plate 86 in order to regulate the amount of feed which will accumulate on the gate before the feed rises into the feed measuring tubes 98 and 100.

Clamp 114 comprises a metal plate 116 having a portion 116A extending along one side of the leg 112 and a flange 116B bolted to the hopper wall 68. The portion 116A has an aperture in alignment with an aperture in the hopper wall 68. A nut 118 (FIG. 4) is welded on the inner surface of wall 68 over the aperture therein. A bent rod 120, having a collar 122 which abuts the plate 116, extends through the aligned apertures and has a threaded inner end portion engaged with the nut 118. It will be evident that, when the collar is screwed down against the plate 116 the plate will clamp the tube support strap 110 in adjusted position.

When the feed dispensing system 28 (FIG. 1) is operating, the first feed dispensing hopper at 32A will receive feed until the level of the feed rises in the feed tubes 98 and 100 (FIG. 3) up to the aperture 104 in the feed conveying tube 42. The feed tubes 98 and 100 of that particular hopper are then ineffective to divert any more feed from the feed conveying tube 42, and the feed in tube 42 will be conveyed to the next downstream hopper 32, and so forth until the last hopper at 32B is filled. When the last hopper is filled, a switch associated therewith deenergizes the power drive mechanism 46 (FIG. 1) of the feed dispensing system 28, whereby the feed conveyor chain 50 is stopped.

As is best shown in FIGURE 3, the lever end portion of the leg 112 of the strap 110 is provided with a pointer 124 that overlies a scale 126 on the front hopper wall 68. The scale 126 is provided with indicia and numerals indicating weight in pounds of feed. Because the volume of feed material resting on the gate 84 and entrained in the tubes 98 and 100 will always be within close limits each time the hopper is loaded, it is thus possible to correlate the volume with the weight of the feed in pounds, the weight being directly readable on the scale 126. The operation of weighing according to volume is relatively accurate because the particular dimensions of the hopper 32, the gate 84 and the tubes 98 and 100 are predetermined in relation to the average granular size of the feed to be handled, a necessary procedure since feeds of different average granular size will have different angles of repose.

The lowermost position of the feed measuring tube 100 will result in a total volume of feed that weighs, within very close limits for successive charges of one size of feed, three pounds; the other volume limit effected by raising the measuring tube 100 to its highest position results in a feed charge weighing 35 pounds.

The gate 84 (FIG. 3) is opened by a flexible pull cord 130, the gate being swingable about the bolts 92 in a forward and upward direction until the rear marginal edge 132 of the curved plate 86 is positioned beyond the lower edge of the front wall 68 of the hopper. The cord 130 is fastened at its lower end to the angle bar 94 of the gate 84, and its upper end is trained over a pulley 134 which is supported by a U-shaped strap 135. The strap 135 is secured in fixed position to the beam 40 by the lagscrews 64. From the pulley 134, the pull cord 130 (FIGS. 1 and 2) extends toward and is connected to a cable 136 (FIG. 1) which extends along the aisle 26 and is connected to the power dumping mechanism 34. As will be presently described, the power dumping mechanism 34 is adapted to periodically pull the cable 136, whereby the gates 84 of all the hoppers 32 are simultaneously opened to release their contents into the pens 22.

The last feed-dispensing hopper in the system at 32B (FIGS. 1 and 4) is provided with a feed measuring tube comprising the upper tubular section 98, and a lower tubular section 138 that is telescoped over tube 98 and is supported by the strap 110 in a preselected position above the curved plate 86 of the gate 4. The cross-sectional area of the bottom portion of the tube 138 is larger than the corresponding area of one of the tubes 100. For the same weight of feed to be collected in the hopper at 32BB as is collected in the other hoppers, the bottom end of the measuring tube 138 is at a slightly higher elevation above the plate 86 than the bottom end of the tube 100 (FIG. 3) is from its associated plate 86, even though this results in the tube 138 depositing a greater volume of feed directly on its plate 86 due to its larger cross sectional area. The reason for the above condition is that means are provided to stop the feed chain 50 before the feed rises in the tube 138 more than about 3 inches, whereas the feed rises up to the conveyor tube 42 in the measuring tubes of the other hoppers.

The bottom end portion of the tube 138 (FIGS. 4–6) comprises two parallel planar panels 140 and 142 which are integral with the tube and extend toward the rear hopper wall 69. The outer end portions of the panels 140 and 142 are interconnected by a sheet metal member 144 having a lower edge 146 (FIG. 4) which is adapted to act as a stop for a pivotable switch actuating paddle 148.

The switch paddle 148 depends from a rod 150 which is rotatably mounted in apertures in the panels 140 and 142, and has an upwardly directed threaded end portion 152 (FIG. 6). A spring clip 154 is secured to the threaded end portion of the rod between two lock nuts 156. A mercury switch 158 is gripped by the spring clip 154, the electrical contacts of the switch being in "closed" condition when the switch is in its illustrated horizontal position, with the switch paddle 148 upright. In the absence of any feed within the hopper at 32B, the rod 150 is biased by the weight of the depending switch paddle 148 to position the switch 158 horizontal.

Thus, when the feed accumulates on the curved plate 86 and begins to rise in the measuring tube 138, the switch paddle 148 will be swung by the lateral pressure of the feed toward the stop edge 146 of the plate 144. When the paddle 148 abuts the edge 146, as shown by the dotted line position 148a, the mercury switch 158 has been thereby tilted and actuated to its "off" position. This described switch actuation causes the power unit 48 (FIG. 1) of the automatic feed dispensing system 28 to be deenergized, and the feed conveying chain 50 stops.

All feed dispensing hoppers 32 in the system are now charged with whatever amounts of feed they have been individually preset to receive, and are now in readiness to discharge feed into their associated pens 22 when the previously mentioned electrical timer energizes the power discharge mechanism 34 (FIG. 1). After the hoppers have been simultaneously dumped by the power discharge mechanism 34, the mercury switch 158 will resume its closed position and will thus again start the drive for the feed chain 50 so that the hoppers will again be filled in readiness for the next feed dumping operation.

The power dumping mechanism 34 (FIGS. 7 and 8) is mounted upon a base plate 160 which is supported by a pair of brackets 162 from the wall of the hog barn 20 at one end of the aisle 26, and includes an electric motor 164, having an integral reduction gear box 166. Motor 164 is secured to an upstanding mounting plate 168 and the gear box 166 is provided with a driven shaft 170 that projects through a bearing support plate 172. Plate 172 is secured to the base plate 160 and to the mounting plate 168, respectively, by an inverted channel 174 and by an angle bar 176, and supports a bearing 184 for the shaft 170. The outer end portion of shaft 170 has a hub 186 keyed thereon, and one end portion of a lever arm 188 is welded to the hub.

A collar 190 is secured to the hub 186 by a recessed set screw 192, and is provided with a projecting round head screw 194 (FIG. 8). The head of the screw 194 is adapted to contact a roller 196 of an actuating arm 198 which is associated with a normally closed limit switch 200. Switch 200 is mounted on a shelf 202 that is bolted to the bearing support plate 172, and its electrical contacts are opened each time the head of the screw 194 contacts roller 196.

The free end of the lever arm 188 is provided with a projecting pin 204 on which a cable thimble or eye 206 is held by a washer 208 and a snap ring 209. One end of the cable 136 is wrapped around the thimble 206, and the opposite end portion of the cable 136 (FIGS. 1 and 2) is trained over a wall mounted pulley 210 and is connected to a weight 212 that maintains the cable in taut condition.

In FIGURE 9 a control circuit for the dumping mechanism is illustrated. When this circuit goes into operation, the feed conveyor motor 48 has already been stopped due to the opening of switch 158 in the last hopper—accordingly, the normally closed switch 158 is shown in open position.

Motor 164 (FIGS. 7 and 9) is connected to one electrical power input line L2 by a line 214, and is connected by a line 215 to a normally open relay contact 216 of a control relay CR. Contact 216 is connected by a line 218 to the other power input line L1, and closes upon energization of the coil 220 of the relay CR to energize the motor 164. Energization of the relay coil 220 is effected by the contacts 222 of a clock type timer T, the motor coil 224 of which is continuously energized from the power input lines L1 and L2.

The relay CR is provided with holding contacts 226 that are connected to the relay coil 220 and to the line L1 through the motor switch 200. The relay holding contacts 226 are thus arranged to close to maintain energization of the relay coil 220 when the timer contacts 222 momentarily close and initiate said energization at whatever preselected times the feed dumping cycles are to begin. The relay contacts 216, accordingly, remain closed and maintain the motor 164 in an energized condition.

When the motor 164 is energized, the lever arm 188 (FIG. 8) begins to swing about the axis of the shaft 170 in the direction of the arrow 228, whereby the cable 136 is pulled. The pull cords 130 (FIG. 1) connected to the cable and to each of the hopper gates 84 are thus simultaneously actuated to open the hopper gates and dump the feed from the hoppers into the pens. Before the lever 188 has swung through 360 degrees, the head of the screw 194 contacts switch roller 196 and causes the contacts of this switch 200 to open, thus deenergizing the coil 220 (FIG. 9) of the control relay CR. Motor 164 is thereby deenergized since the relay contacts 216 open as soon as the relay coil 220 is deenergized. The lever arm 188 (FIG. 8) is carried by momentum of the gear train associated with the motor 164 until the lever reaches its FIGURE 8 rest position in readiness for the next feed dumping operation.

Immediately after the feed is dumped from the last hopper at 32B (FIGS. 1 and 4), the mercury switch 158 returns to its normal horizontal position as the switch actuating paddle 148 swings back to its vertical position. The contacts of switch 158 (FIG. 9) are thereby closed, and the motor 48 of the feed conveyor system 28 is thus again energized to resume movement of the feed chain 50 in order to refill the feed dispensing hoppers 32. Just prior to energization of the motor 48, the lever arm 188 (FIG. 8) has returned near or to its illustrated normal rest position, and the hopper gates 84, accordingly, have been swung closed by gravity because the pull cords 130 (FIGS. 1 and 2) are slack.

It is to be particularly noted that if some malfunction will not allow the hoppers 32 to be dumped, no more feed will be delivered to the hoppers because the mercury switch 158 (FIGS. 4 and 9) on the hopper at 32B will remain open, or in an "off" position until such time as the hoppers are dumped. Also, the gravity closure feature of the hopper gates 84 is an important part of the invention because, if a mechanical failure of the mercury switch 158 should maintain the feed conveyor motor 48 energized so that the feed supply to the hoppers would not shut off, the hopper gates 84 will remain in closed position until the timer T initiates the dumping cycle. Thus, contrary to other overhead feeding systems, the gravity closing feature of the feed dispensing hoppers 32 of the herein disclosed automatic feeding system will prevent an endless flood of feed from being dumped into the pens 22 before the malfunction is corrected.

Having thus described the invention, that which is believed to be new and for which protection by Letters Patent is desired is:

1. In a feed dispensing system, a stationary hopper having an open bottom end, a gate pivotally mounted on said hopper and arranged for mechanical and gravity operation to respectively open and close the bottom end of said hopper, an elongate gate opening member longitudinally movable away from a rest position adjacent the hopper during opening of said gate, a rotatable shaft adjacent one end of said elongated member, a crank arm secured to said shaft and operatively connected to said elongated gate opening member, power means connected to said shaft for effecting said movement of said gate opening member, a normally slack supple link interconnecting said gate opening member and said gate, said link being tensioned during movement of said gate opening member away from said rest position whereby the gate is mechanically opened and is then released from mechanical control to close by gravity when said gate opening member returns toward said rest position, and control means for actuating said power means at predetermined intervals for rotating said shaft and crank arm whereby said gate opening member moves away from and returns to said rest position for each actuation of said power means, and means included in said control means for deactivating said power means so that movement of the shaft terminates upon completion of a single rotation of said shaft for each actuation of said power means.

2. Feed dispensing apparatus for simultaneously supplying a regulated amount of feed to each of a plurality of feeding stations comprising a feed supply conveyor extending over the feeding stations, a tubular hopper body mounted below said feed conveyor in fixed position relative to said conveyor at each of the feeding stations, each of said hopper bodies being provided with a pivotally mounted gate which normally closes the open lower end of the body and is urged by gravity toward said normally closed position, feed measuring means for transferring feed by gravity from said feed conveyor into each of said hopper bodies, a longitudinally movable elongate gate actuating member movable between a gate-open position and a gate-closed position and biased toward said gate-closed position, power means connected to said gate actuating member and operable in one feed supplying operation to pull said gate actuating member away from said gate-closed position and then release said member for return to its gate-closed position, and flexible normally slack linking means interconnecting each of said gates with said gate actuating member for opening said gates when the slack is removed from said linking means by said gate actuating member incident to movement away from gate-closed position whereby mechanical control of the gates ceases when said gate actuating member is released so that gravity closes the gates.

3. A livestock feeding system comprising a bulk feed bin adjacent a plurality of feeding stations, a feed conveying tube extending from said bulk feed bin over each feeding station, power driven means for forcibly conveying feed through said feed conveying tube, said tube being provided with a feed dispensing aperture in the lower portion thereof above each of the feeding stations, a feed hopper body mounted below each of said apertures, a plurality of feed measuring tubes each depending from said feed conveying tube in communication with one of said apertures and terminating within its associated feed hopper body, a gate pivotally mounted on each of said hoppers across the open bottom end thereof for swinging movement from a closed position underlying the hopper body to an open position unobstructing said end, an axially movable elongated gate actuating member adjacent said hopper gates and biased toward one limit of movement, a plurality of flexible linking means connected between the associated gates and said elongated gate actuating member and being slack when said gate actuating member is at said one limit of movement, a shaft journalled for rotation adjacent one end of said gate actuating member, a crank arm rigidly secured to said shaft and pivotally connected to said one end of said gate actuating member, a motor for driving said shaft whereby said crank reciprocates said gate actuating member between said one limit of movement wherein all of said gates are closed and a position wherein all of said gates are simultaneously opened, control means for actuating said motor at predetermined timed intervals and for limiting the amount of rotation for each actuation to one complete revolution of said shaft whereby said gates are mechanically opened and are allowed to be closed by gravity, electrical switch means mounted within one of said hopper bodies for sensing a predetermined amount of feed in said body, and a control circuit governed by said switch and connected to said conveyor power means for energizing said power means when said open hopper body is empty.

References Cited by the Examiner
UNITED STATES PATENTS

| 811,038 | 1/06 | Croshier | 119—51.13 |
| 1,061,348 | 5/13 | Willford | 222—286 |
| 2,661,876 | 12/53 | Kindseth. | |
| 3,033,163 | 5/62 | Hostetler et al. | 119—52 |
| 3,085,552 | 4/63 | Pilch | 119—57 |

LOUIS J. DEMBO, *Primary Examiner.*

HUGH R. CHAMBLEE, *Examiner.*